US008632915B2

(12) United States Patent
Lemmon et al.

(10) Patent No.: US 8,632,915 B2
(45) Date of Patent: Jan. 21, 2014

(54) NANOCOMPOSITE PROTECTIVE COATINGS FOR BATTERY ANODES

(75) Inventors: John P. Lemmon, Kennewick, WA (US); Jie Xiao, Richland, WA (US); Jun Liu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 476 days.

(21) Appl. No.: 13/088,652

(22) Filed: Apr. 18, 2011

(65) Prior Publication Data

US 2011/0262810 A1 Oct. 27, 2011

Related U.S. Application Data

(60) Provisional application No. 61/327,873, filed on Apr. 26, 2010.

(51) Int. Cl.
*H01M 4/134* (2010.01)
(52) U.S. Cl.
USPC ...................................... 429/231.9
(58) Field of Classification Search
None
See application file for complete search history.

(56) References Cited

U.S. PATENT DOCUMENTS

| 7,066,971 | B1 | 6/2006 | Carlson |
| 7,247,408 | B2 | 7/2007 | Skotheim et al. |
| 2005/0042503 | A1* | 2/2005 | Kim et al. ................ 429/137 |
| 2005/0079420 | A1* | 4/2005 | Cho et al. ............. 429/231.95 |
| 2006/0154144 | A1* | 7/2006 | Gorkovenko et al. ....... 429/188 |
| 2007/0224502 | A1 | 9/2007 | Affinito et al. |
| 2008/0318128 | A1 | 12/2008 | Simoneau et al. |
| 2009/0035646 | A1 | 2/2009 | Mikhaylik et al. |

FOREIGN PATENT DOCUMENTS

| EP | 1233464 A1 | 8/2002 |
| EP | 1583168 A2 | 5/2005 |
| EP | 1344265 B1 | 2/2008 |
| WO | 2009089018 A2 | 7/2009 |

* cited by examiner

*Primary Examiner* — Patrick Ryan
*Assistant Examiner* — Wyatt McConnell
(74) *Attorney, Agent, or Firm* — Allan C. Tuan (57) ABSTRACT

Modified surfaces on metal anodes for batteries can help resist formation of malfunction-inducing surface defects. The modification can include application of a protective nanocomposite coating that can inhibit formation of surface defects, such as dendrites, on the anode during charge/discharge cycles. For example, for anodes having a metal (M'), the protective coating can be characterized by products of chemical or electrochemical dissociation of a nanocomposite containing a polymer and an exfoliated compound ($M_a'M_b''X_c$). The metal, M', comprises Li, Na, or Zn. The exfoliated compound comprises M' among lamella of $M_b''X_c$, wherein M" is Fe, Mo, Ta, W, or V, and X is S, O, or Se.

18 Claims, 7 Drawing Sheets

NANOCOMPOSITE PROTECTIVE COATINGS FOR BATTERY ANODES

PRIORITY

This invention claims priority from, and incorporates by reference, U.S. Provisional Patent Application 61/327,873, entitled Nanocomposite of Metal Oxides or Disulfides as Electrodes for Lithium Ion Batteries, filed Apr. 26, 2010.

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Rechargeable batteries comprising metal anodes including, but not limited to, lithium, sodium, and zinc, can be crucial to the development and deployment of many electronic devices, electric vehicles, and other systems requiring energy storage. However, one disadvantage of these rechargeable batteries is the development of surface defects over several charge/discharge cycles. In a particular example, dendrite formation can cause malfunctions such as a short circuiting and/or overheating. Therefore, a need exists for battery anodes having modified surfaces that are not susceptible to the formation of malfunction-inducing surface defects.

SUMMARY

The present invention relates to modified surfaces on metal anodes for batteries and to methods for performing such modifications. The modification can include application of a protective coating comprising a nanocomposite that can inhibit formation of surface defects on the anode during charge/discharge cycles.

In one embodiment, for anodes comprising a metal (M'), the protective coating is characterized by products of chemical or electrochemical dissociation of a nanocomposite containing a polymer and an exfoliated compound ($M_a'M_b"X_c$). The metal, M', comprises Li, Na, or Zn. The exfoliated compound comprises M' among lamella of $M_b"X_c$, wherein M" is Fe, Mo, Ta, W, or V, and X is S, O, or Se.

The nanocomposite can comprise a substantially disordered arrangement of $M_b"X_c$ lamella. Alternatively, the nanocomposite can comprise a substantially layered arrangement of $M_b"X_c$ lamella. The products of the chemical or electrochemical dissocation of the nanocomposite can comprise at least one of $M_r'X_s$, $M"/M_t'$, $M_u"$, and $X_v$ in a matrix of the polymer. In other words, the polymer can form a matrix in which the dissociation products are distributed.

As used herein, $M"/M_t'$ composite can refer to a chemical interaction between M' and M". For example, the M' can be accommodated within defect sites of the M".

In some embodiments, the polymer further comprises graphene. Preferably, the polymer comprises polyether functionality. As used herein, polyether functionality refers to compounds containing more than one ether (C—O—C) group. Polyether generally refers to polymers which contain the ether functional group in their main chain. The term glycol is reserved for low to medium range molar mass polymers when the nature of the end-group, which is usually a hydroxyl group, still has a substantial effect on the behavior of the polymer. The term "oxide" or other terms are used for high molar mass polymers where the end-groups no longer affect polymer properties. One example of a polymer having polyether functionality includes, but is not limited to, polyethylene oxide (PEO).

A preferred embodiment of the present invention comprises a battery having an anode comprising Li and a protective coating over the anode. The protective coating is characterized by products of anodic reduction of a nanocomposite containing a polymer and an exfoliated intercalation compound ($Li_aMoS_2$) comprising Li among lamella of $MoS_2$, the products of anodic reduction comprising at least one of $Li_2S$, $S_8$, Mo, Li/Mo, and polysuflide in a matrix of the polymer. The polymer can further comprise graphene, in some instances.

Modification of the metal anode (M'), which comprises Li, Na, or Zn, can involve application of a protective coating. In one embodiment, the method of preparing the protective coating on the battery anode comprises exfoliating an intercalation compound ($M_a'M_b"X_c$) in a solution. The exfoliation yields a colloid comprising substantially separated lamella of $M_b"X_c$; wherein M" is Fe, Mo, Ta, W, or V, and X is S, O, or Se. The method further comprises absorbing a polymer to the lamella of $M_b"X_c$ in the colloid and then forming a nanocomposite by drying the colloid. The nanocomposite comprises the polymer and M' among lamella of $M_b"X_c$. The lamella can be substantially layered or they can be substantially disordered in arrangement. The nanocomposite is applied to the anode. One way to perform the application can involve contacting the anode and the polymer/colloid mixture prior to drying. The nanocomposite is then chemically or electrochemically dissociated to yield a product comprising at least one of $M_r'X_s$, $M"/M_t'$, $M_u"$, and $X_v$ in a matrix of the polymer. In some embodiments, the method can further comprise reacting $X_v$ with dendrites comprising M' formed on surfaces of the anode.

Preferably the polymer comprises polyether functionality. One example of such a polymer includes, but is not limited to, PEO. In some embodiments, the colloid further comprises graphene.

In a particular embodiment, M' is Li, $M_a'M_b"X_c$ is $Li_a$-$MoS_2$, $M_b"X_c$ is $MoS_2$, $M_r'X_s$ is $Li_2S$, $M"/M_t'$ is $Mo/Li_t$, $M_u"$ is $Mo_u$, and $X_v$ is $S_8$ or polysulfide.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Embodiments of the present invention include modified battery anodes that are resistant to formation of surface defects that can cause poor battery performance and/or malfunction. The modification can be a protective coating comprising the products from chemical or electrochemical dissociation of a nanocomposite containing a polymer and an exfoliated intercalation compound, $(M_a'M_b''X_c)$, wherein M' is Li, Na, or Zn, M" is Fe, Mo, Ta, W, or V, and X is S, O, or Se.

General tests of the nanocomposite material formed as an entire anode, rather than a protective coating, revealed unexpectedly that, the dissociation irreversibly alters the structure and composition of the nanocomposite. The altered nanocomposite maintains reversible capacity with little degradation over many charge/discharge cycles. The tests suggest that a discharge mechanism of the nanocomposite results in the formation of at least one of $M_r'X_s$, $M''/M_t'$, $M_u''$, and $X_v$ in a matrix of the polymer at the end of the discharge process. The applicability of the altered nanocomposite as an anode and the discharge mechanism make the altered nanocomposite well suited for application to anode surfaces as a protective coating that helps resist formation of surface defects.

FIGS. 1-7 show a variety of aspects and embodiments of the present invention through a particular example of a nanocomposite comprising lithium, poly(ethylene oxide) (PEO), molybdenum disulfide, and optionally graphene. The figures refer to the nanocomposite material properties and to entire anodes comprising the nanocomposite material.

During a first discharge, the nanocomposite electrochemically dissociates irreversibly into the dissociation products, $Li_2S$ and Mo. The $Li_2S$ and Mo are then able to continuously cycle according to the following reaction.

(discharging) $Li_2S+Mo/Li_x \leftrightarrow S+Mo+Li_{x+2}$(charging)　　(1)

The S, which can exist as soluble polysulfide, has an affinity for Li and can consume surface defects such as Li dendrites when present as a protective coating on a Li anode.

The nanocomposite was prepared by exfoliation of a lithiated $MoS_2$ to form a colloid followed by adsorption of the PEO polymer into the separated lamella. Exfoliation of $MoS_2$ into single sheets was achieved through the rapid hydrolysis and sonication of $Li_xMoS_2$. 10 mg PEO was dissolved in 20 ml deionized water and then poured into the $Li_xMoS_2$ quickly and sonicated for 2 hours. The dispersion was then separated by centrifugation. Without washing, the nanocomposite was dried at 80° C. overnight. The weight ratio of $MoS_2$:PEO:graphene was maintained at 93:2:5, respectively. As a control, the exfoliated $MoS_2$ without any PEO was also prepared. Details regarding preparation of the lithiated $MoS_2$ are described by Lemmon et al. (*Chem. Mater.* 1994, 6, 207), which details are incorporated herein by reference.

For electrical and electrochemical measurements, electrodes were prepared by casting a slurry of the $MoS_2$/PEO composite, conductive carbon black, and poly(vinylidene fluoride) (PVDF) in N-methyl pyrrolidone (NMP) solvent onto a copper foil. After drying, the electrodes were punched into 1.4 cm ø disks. The typical loading of the active materials in the electrode is 1-5 mg/cm². Lithium metal was, used as an anode in a type 2325 coin-cell system assembled in an argon-filled glove box. The electrolyte consisted of 1M $LiPF_6$ in a mixture of ethylene methyl carbonate (EMC) and ethylene carbonate (EC) at a 7:3 volume ratio. The electrochemical tests were performed on a battery tester at room temperature. The cells were cycled between 0.01 and 3.0 V vs. Li/Li⁺ at 50 mA/g unless otherwise specified.

Figure 1:
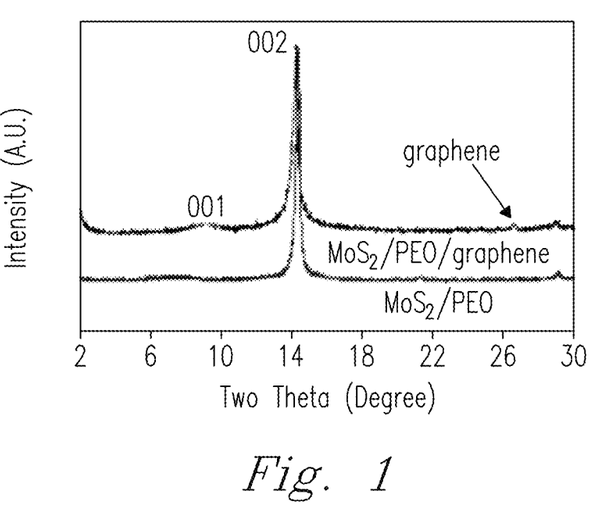
FIG. 1 includes X-ray diffraction (XRD) patterns comparing different $MoS_2$/PEO nanocomposites with and without graphene according to embodiments of the present invention.

Referring first to FIG. 1, the XRD patterns of exfoliated $MoS_2$/PEO ($MoS_2$—P) and exfoliated $MoS_2$/PEO/graphene ($MoS_2$—PG) composites are compared in FIG. 1. Even though the amounts of PEO in the $MoS_2$—PG and $MoS_2$—P composites were approximately the same (i.e., 5%), the peak corresponding to the (001) reflection shifts to a higher angle in the $MoS_2$—PG, suggesting an interlayer decrease of ~2 Å in this direction. The interference from graphene during the exfoliation process may decrease the amount of PEO molecules finally absorbed on the single layer of $MoS_2$, or the graphene may be absorbed and subsequently trapped between the $MoS_2$ layers upon restacking as indicated by the decrease in (001) reflection. Graphene also is clearly shown in FIG. 1 for the $MoS_2$—PG composite. The peak at ~26° can be attributed to the layer-to-layer distance of the graphene sheets; however, there is no solid evidence to confirm that the graphene is between the $MoS_2$ layers, as the case for PEO, or on the surface of the $MoS_2$.

Figure 2:
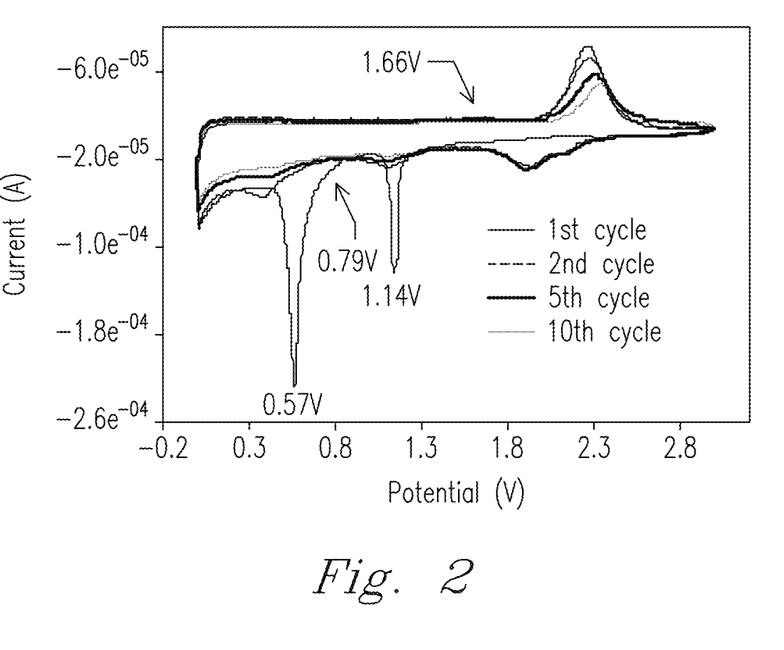
FIG. 2 is a graph showing cyclic voltammetry data for a $MoS_2$/PEO/graphene nanocomposite according to embodiments of the present invention. The scan rate was 0.1 mV/s.
Figure 3A:
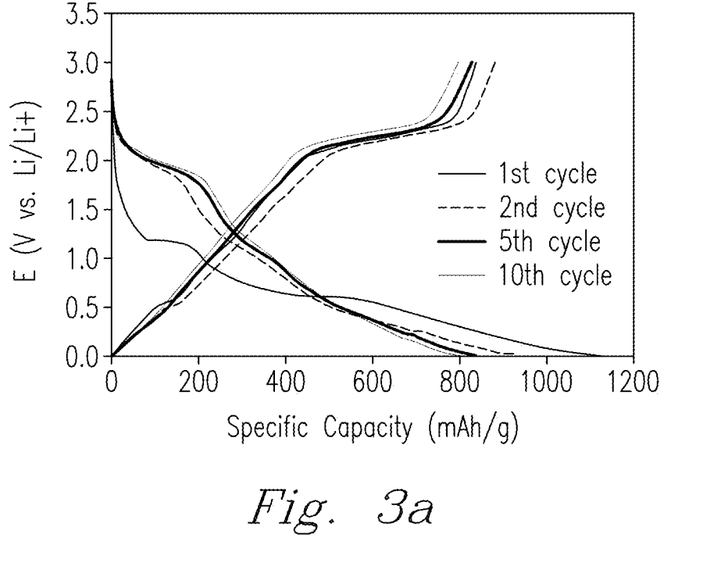
FIGS. 3a-3c depict the electrochemical performance of a $MoS_2$/PEO/graphene nanocomposite a) voltage profiles, b) cycling ability of $MoS_2$/PEO/graphene, and c) Nyquist plots of pure exfoliated $MoS_2$ before and after cycles. The cells are cycled at 50 mA/g between 0.01 V and 3.0 V. The capacity is based on the weight of the whole composite.
Figure 4:
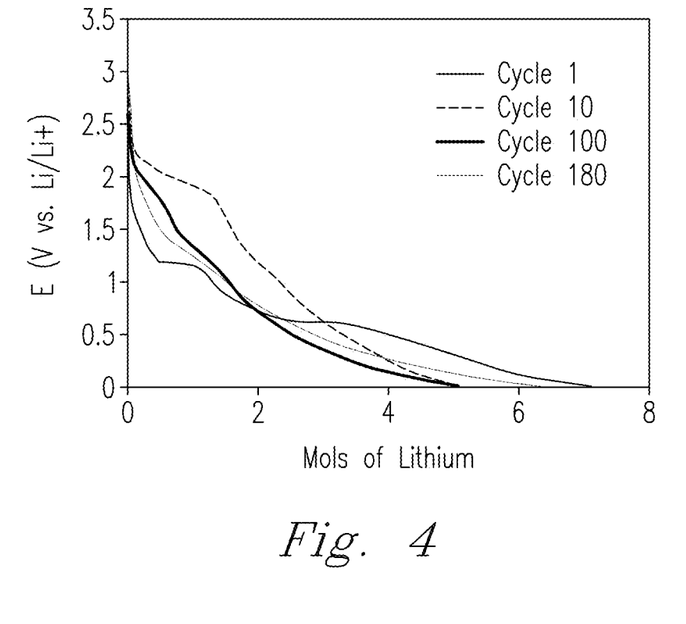
FIG. 4 depicts the voltage dependence of the lithiation of a $MoS_2$/PEO nanocomposite as a function of cycle number.

The electrochemical properties of the $MoS_2$—PG composite were investigated by cyclic voltammetry in FIG. 2. The sharp peak at 1.14 V in the first cathodic scanning can be attributed to the insertion of Li$^+$ ions into MoS$_2$ layers, thus forming LiMoS$_2$. The discharge capacity (see FIG. 3) corresponding to the cut-off voltage at 1.0 V is ~180 mAh/g, which is consistent with the theoretical discharge capacity of MoS$_2$ (i.e., 167 mAh/g) assuming only one mole of Li$^+$ is intercalated. Before reaching the sharp peak at 0.57 V, a broad shoulder starts to evolve from 0.79 V. This feature corresponds to the insertion of additional Li$^+$ ions within the expanded MoS$_2$ structure or in the defect sites of MoS$_2$. The distinct reduction peak at 0.57 V is considered to reflect the deposition of Mo metal along with the Li$_2$S. The voltage dependent lithiation is shown in FIG. 4 and the whole discharge reaction can be expressed as two-step process based on the following reactions:

$$MoS_2 + xLi^+ + xe^- = Li_xMoS_2 (x=3-4) \quad (2)$$

$$Li_xMoS_2 + 4Li^+ + 4e^- = 2Li_2S + Mo/Li_y \quad (3)$$

In bulk form, the solubility of Li is very low in Mo, and no alloys are formed. However, the reversible cycling results indicate that Mo can accommodate a large amount of Li$^+$ ions, especially when surface PEO exists. This is described in further detail elsewhere herein based on voltage profiles of MoS$_2$—PG. During anodic scanning, Li$^+$ ions associated with Mo reduction are initially removed at 1.66 V. Only one peak at 2.3 V is observed, corresponding to the oxidation of Li$_2$S into sulfur (S). Therefore, after the first cycle, the electrode can be regarded as a mixture of S and Mo instead of the original MoS$_2$. Accordingly, the reduction peak at ~2.0 V is indicative of the formation of Li$_2$S. Further investigation reveals that the reduction peak at 2.1 V splits into two parts occurring at 2.11 V and 2.0V, respectively, which agrees well with the kinetics of the conversion from element S$_8$ to polysulfides and then to Li$_2$S. Note that the transition between the as-formed Li$_2$S and S is influenced by the presence of Mo, which can modify the chemistry based on the S alone (see FIG. 5). The other two reduction peaks occurring at 1.07 V and 0.37 V are attributed to the association of Li with Mo. The intensities of both of these peaks continuously decrease with cycling.

Figure 3B:
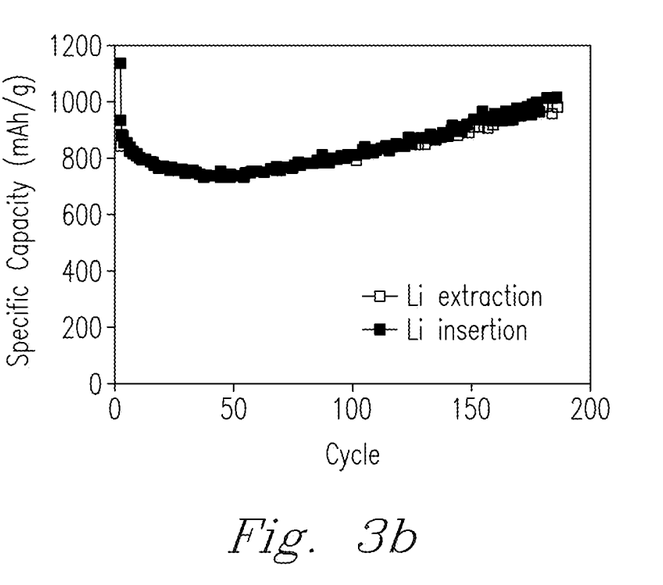
Figure 3C:
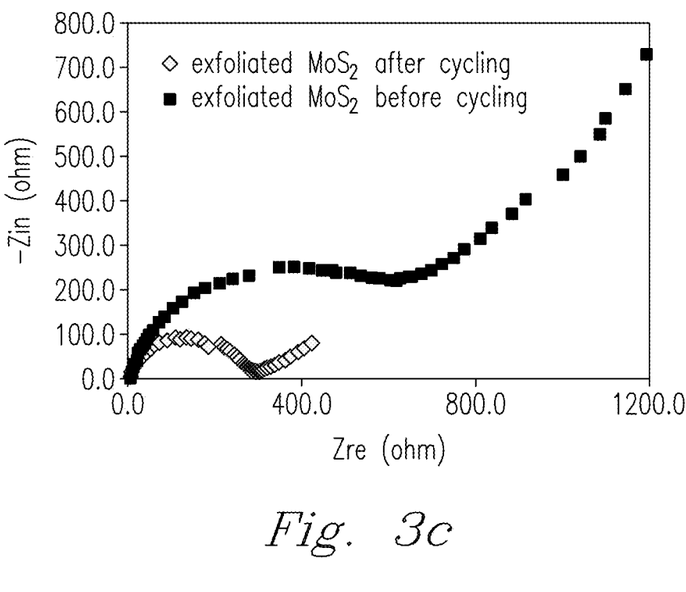

The charge-discharge curves at 1st, 2nd, 5th and 10th cycle for MoS$_2$—PG are plotted and compared in FIG. 3a. After the first discharge, the evolution of the new charge-discharge plateaus between 1.8 V and 2.5 V agrees well with the CV plot, suggesting a redox reaction between Li and S. The coexistence of Mo metal and PEO seems to alleviate the diffusion of soluble polysulfide (Li$_2$S$_8$ and Li$_2$S$_4$) into the electrolyte during the charge/discharge process because the capacity fading between 2.0 V to 2.5 V is much slower than in the common Li—S cells without any lithium protection coating. It is possible that the as-formed polysulfides are attracted in the Mo host by sharing bonds with Li. The first cycle efficiency of MoS$_2$—PG composite is only 74% in FIG. 3a with an irreversible capacity of around 200 mAh/g. This is mainly due to the electrolyte decomposition in the first discharge process. The small plateau at ~1.2 V during the first discharge reflects the formation of the solid electrolyte interface (SEI) film and contributes to the irreversible capacity thus lowering the efficiency in the first cycle. Excellent cycling performance is achieved as shown in FIG. 3b. After 50 stable cycles, a continuous capacity increase is observed during subsequent cycling. The reversible capacity even approaches the initial discharge capacity of more than 1000 mAh/g after 180 cycles and is also shown in FIG. 4 as the amount of lithium increase for the later cycles. This observation is repeatable.

Repeated deposition of Mo during cycling is believed to improve the intrinsic electronic conductivity of the composite in addition to the increase due to graphene. The electrochemical impedance was measured for the pure exfoliated MoS$_2$ electrode before and after cycling to exclude the interference from graphene (see FIG. 3c). The Nyquist plots show a depressed semicircle before cycles at high frequencies. Because the electrode has not been activated, the diameter of the semicircle is large, which is a measure of the resistance of the SEI layer on the electrode surface. After cycling, the depressed semicircle consists of two semicircles that are not clearly separated (see FIG. 3c). The reduced diameter of the semicircle at high frequencies suggests decreased impedance between the SEI layer and the MoS$_2$—PG electrode. Due to the absence of PEO or graphene in this pure MoS$_2$-based electrode, the impedance reduction should result from intrinsic changes between the electrode and the SEI layer. The presence of Mo metal after the first discharge significantly improves the electronic conductivity of the whole electrode.

Figure 5:
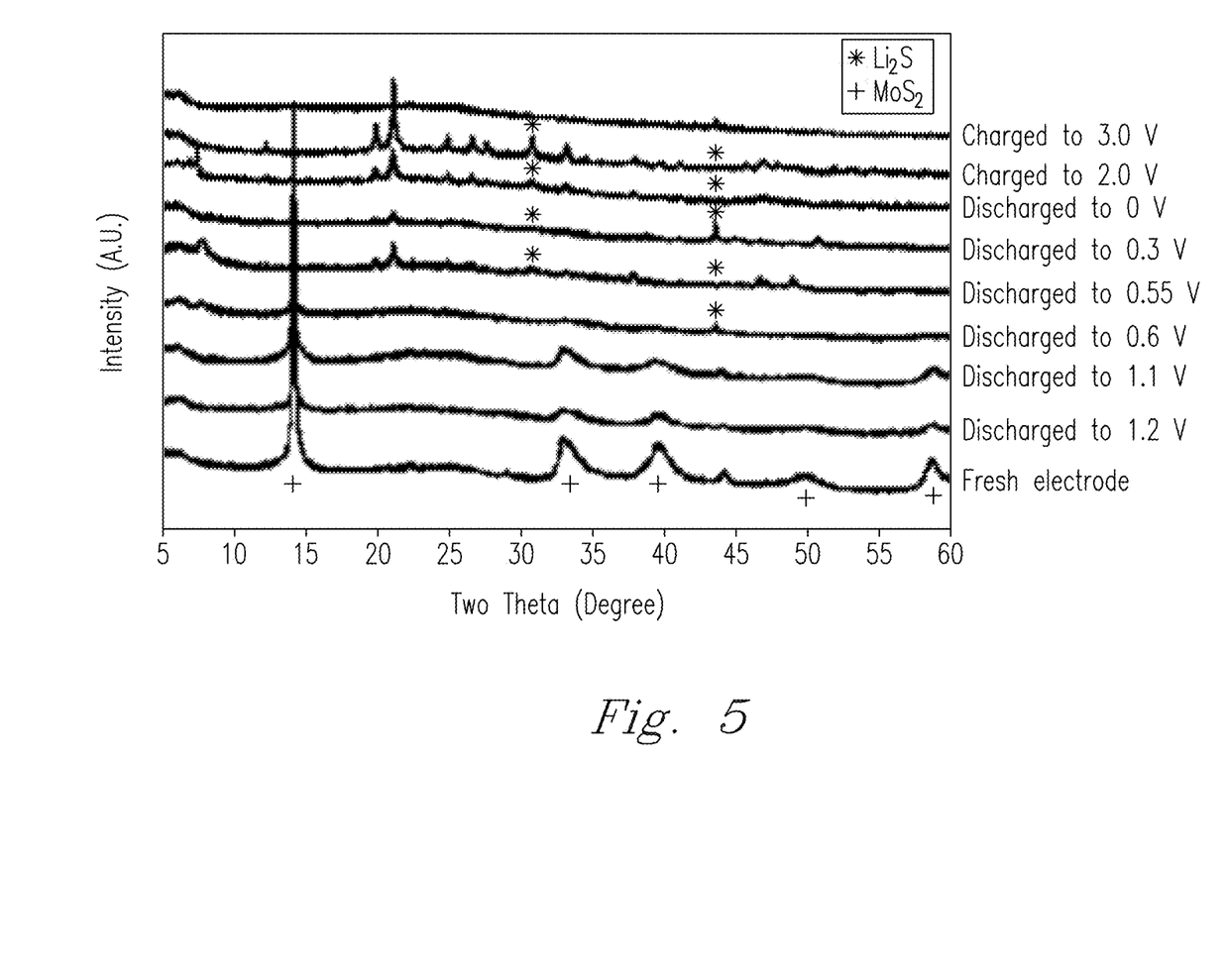
FIG. 5 compares XRD patterns of $MoS_2$/PEO electrodes at different depths of discharge and states of charge.

Data obtained from ex situ X-ray diffraction (XRD) patterns of MoS$_2$-based electrodes at different depths of discharge (DOD) and states of charge (SOC) are shown in FIG. 5 and corroborate the discharge mechanism described above. It is clear from the XRD data that the characteristic peaks of MoS$_2$ shifts to a lower angle at the beginning of the discharge process. This is consistent with the intercalation of Li$^+$ ions within the layers (equation 2), which further expands the d-spacing of the MoS$_2$ structures. When discharged to 0.6 V, most of the MoS$_2$ peaks disappear, while Li$_2$S peaks corresponding to the reaction mechanism expressed in equation 3 begin to appear. This observation matches well with the CV results discussed earlier in which the peak at 0.57 V represents the formation of Li$_2$S and Mo. As the discharge process continues, the peaks associated with MoS$_2$ completely disappear, while more peaks associated with Li$_2$S appear (see FIG. 5). However, no Mo or MoLi$_x$ alloy was detected during the whole discharge, suggesting that the Mo or MoLi$_x$ is present in an amorphous state. When the electrode is recharged to 2.0 V, Li$_2$S remains in the electrode because the over potential of the Li$_2$S oxidation has not been reached yet. The specific capacity reached before 2.0 V, as shown in FIG. 4, mainly comes from the interaction of Li$^+$ ions with the Mo. Further increasing the charge voltage to 3.0 V yields a diffraction pattern with no peaks (see FIG. 5), which indicates that the charged product is amorphous sulfur. Structural variations at different DODs and SOCs are consistent with the voltage profiles and CV results discussed above.

Morphology changes of the MoS$_2$ electrode, HRTEM images and selected-area electron diffraction (SAED) patterns for the fresh, discharged, and charged electrodes are compared in FIG. 6. The large plate-shaped MoS$_2$ grains are evident in FIG. 6a. The clearly separated layers are similar with that of the MoS$_2$/PEO composite that was reported elsewhere.[21] The PEO and graphene can be seen on the surface of the large MoS$_2$ plates. The SAED pattern in FIG. 6b also shows that the MoS$_2$ in the fresh electrode is well crystallized. However, after discharging to 0.01 V, the morphology completely changes. As shown in FIG. 6c, small round particles are distributed in the PEO matrix with graphene still visible on the edges. Close examination of the particles using the SAED pattern shown in FIG. 6d confirms our previous conclusion that Li$_2$S is one of the discharge products as shown by the fully indexed diffraction pattern of Li$_2$S (Fm3m) with lattice parameter of a=5.708 Å. Neither Mo nor MoLi$_x$ are detected in the TEM images due to their amorphous state.

Figure 6A:
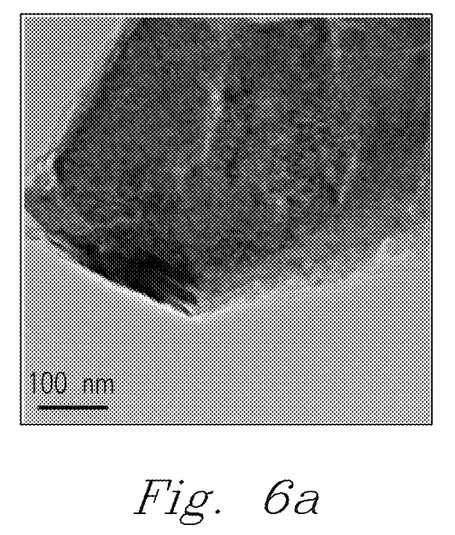
FIG. 6a-6e includes a) TEM images of as-prepared $MoS_2$/PEO/graphene nanocomposite, b) SAED pattern of $MoS_2$ in as-prepared $MoS_2$/PEO/graphene nanocomposite, c) TEM image of discharged $MoS_2$/PEO/graphene electrode, d) SAED pattern of discharged $MoS_2$/PEO/graphene electrode, and e) TEM images of recharged $MoS_2$/PEO/graphene nanocomposite.
Figure 6B:
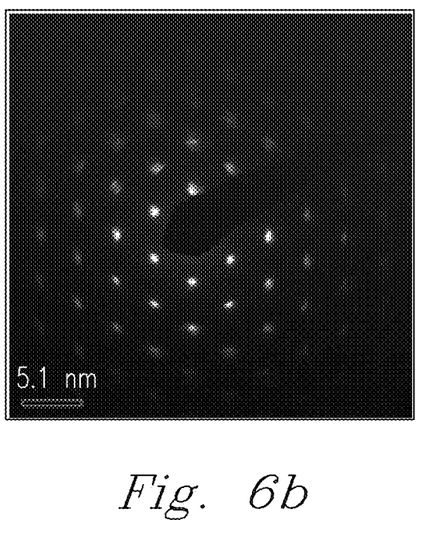
Figure 6C:
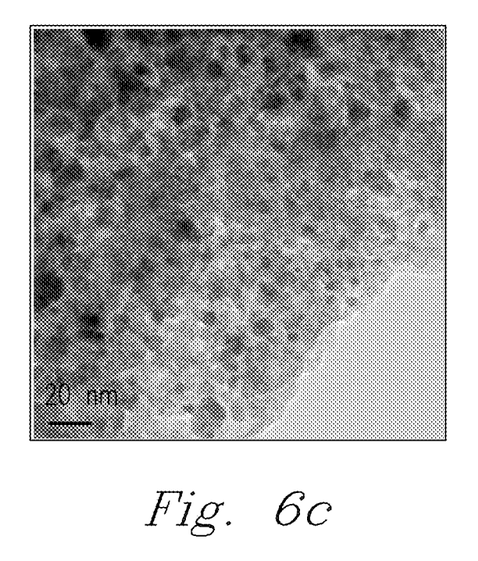
Figure 6D:
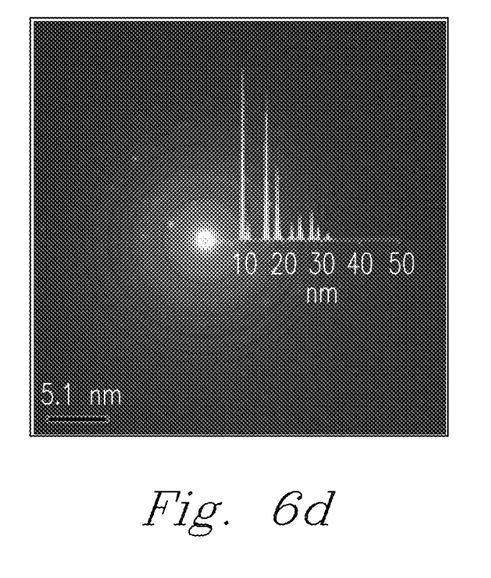
Figure 6E:
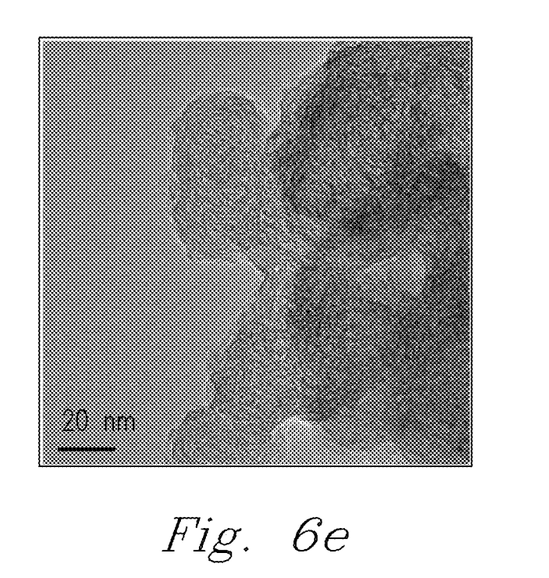

Surprisingly, after recharging the electrode to 3.0 V, there is almost nothing visible in the TEM images except PEO and graphene (see FIG. 6e).

Figure 7:
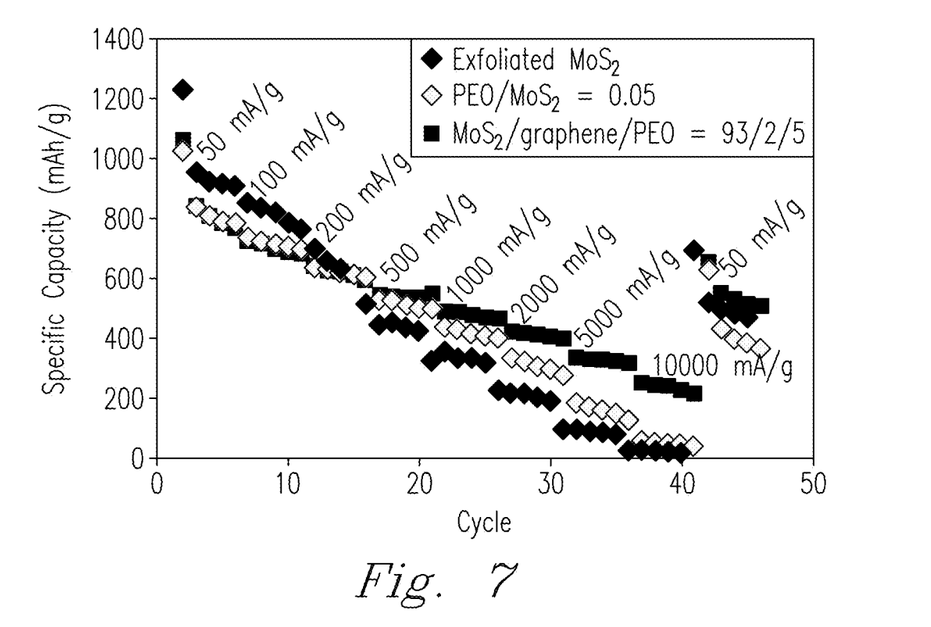
FIG. 7 compares rate capabilities for pure exfoliated $MoS_2$, $MoS_2$/PEO, and $MoS_2$/PEO/graphene nanocomposites.

To demonstrate the role of graphene and PEO in the composite, the rate capability of the $MoS_2$—P and $MoS_2$—PG are compared in FIG. 7. At a low rate of 50 mAh/g or 100 mA/g, the reversible capacities of $MoS_2$—P and $MoS_2$—PG are slightly lower than that of pure, exfoliated $MoS_2$ without PEO and graphene. This finding is understandable because the whole capacity is calculated based on the total weight of the composite instead of just the $MoS_2$. At a rate of 200 mA/g the deliverable capacities of all three samples converged at ~650 mAh/g. As the current rate is further increased above 500 mA/g, the differences among pure $MoS_2$, $MoS_2$—P, and $MoS_2$—PG became pronounced. During exfoliation, PEO was intercalated in the $MoS_2$ galleries and partially coated on the surface of $MoS_2$, leading to improved ionic conductivity. Thus, the transport of $Li^+$ ions between the electrolyte and solid particles is accelerated in $MoS_2$—P, improving the rate capability of the whole electrode. At a very high current density of 5000 mA/g, the effect of incorporating graphene becomes obvious since only $MoS_2$—PG maintains a high capacity of 335 mAh/g, which is close to the theoretical value of graphite (i.e., 375 mAh/g). The incorporation of graphene not only improves the electronic conductivity of the composite it is thought to facilitate the transport of $Li^+$ ions, especially at high rates during which $Li^+$ ion transport between the $MoS_2$ and the electrolyte becomes critical. A very small amount of graphene (i.e., 2%) can be effective in improving the rate capability of the whole electrode. After high-rate discharging at 10000 mA/g, the capacity can be restored to 654 mAh/g at a recovery rate of 50 mA/g, which is indicative of excellent rate performance.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A protective coating on battery anodes comprising a metal (M'), wherein M' is Li, Na, or Zn, the protective coating characterized by products of chemical or electrochemical dissociation of a nanocomposite containing a polymer and an exfoliated intercalation compound ($M_a'M_b''X_c$) comprising M' among lamella of $M_b''X_c$, wherein M" is Fe, Mo, Ta, W, or V, and X is S, O, or Se.

2. The protective coating of claim 1, wherein the products of electrochemical dissociation comprise at least one of $M_r'X_s$, $M''/M_t'$, $M_u''$, and $X_v$ in a matrix of the polymer.

3. The protective coating of claim 1, further comprising graphene in the matrix of the polymer.

4. The protective coating of claim 1, wherein the nanocomposite has a substantially disordered arrangement of $M_b''X_c$ lamella.

5. The protective coating of claim 1, wherein the nanocomposite has a substantially layered arrangement of $M_b''X_c$ lamella.

6. The protective coating of claim 1, wherein the polymer comprises polyether functionality.

7. The protective coating of claim 6, wherein the polymer comprises polyethylene oxide (PEO).

8. A battery having an anode comprising Li and a protective coating over the anode, the protective coating characterized by products of anodic reduction of a nanocomposite containing a polymer and an exfoliated intercalation compound ($Li_a$-$MoS_2$) comprising Li among lamella of $MoS_2$, the products of anodic reduction comprising at least one of $Li_2S$, $S_8$, Mo, Li/Mo, and polysulfide in a matrix of the polymer.

9. The battery of claim 8, further comprising graphene in the matrix of the polymer.

10. A method of preparing a protective coating for battery anodes comprising a metal (M'), wherein M' is Li, Na, or Zn, the method characterized by the steps of:
    Exfoliating an intercalation compound ($M_a'M_b''X_c$) in a solution to yield a colloid comprising substantially separated lamella of $M_b''X_c$, wherein M" is Fe, Mo, Ta, W, or V, and X is S, O, or Se;
    Adsorbing a polymer to the lamella of $M_b''X_c$ in the colloid;
    Forming a nanocomposite by drying the colloid, the nanocomposite comprising the polymer and M' among lamella of $M_b''X_c$;
    Applying the nanocomposite to surfaces of the anode; and
    Chemically or electrochemically dissociating the nanocomposite to yield a product comprising at least one of $M_r'X_s$, $M''/M_t'$, $M_u''$, and $X_v$ in a matrix of the polymer.

11. The method of claim 10, wherein the colloid further comprises graphene.

12. The method of claim 10, further comprising reacting $X_y$ with dendrites comprising M' formed on surfaces of the battery anode.

13. The method of claim 10, wherein said forming further comprises forming a nanocomposite having a substantially disordered arrangement of lamella of $M_b''X_c$.

14. The method of claim 10, wherein said forming further comprises forming a nanocomposite having a substantially layered arrangement of lamella of $M_b''X_c$.

15. The method of claim 10, wherein the polymer comprises polyether functionality.

16. The method of claim 15, wherein the polymer comprises PEO.

17. The method of claim 10, wherein M' is Li, $M_a'M_b''X_c$ is $Li_aMoS_2$, $M_b''X_c$ is $MoS_2$, $M_r'X_s$ is $Li_2S$, $M''/M_t'$ is $Mo/Li_t$, $M_u''$ is $Mo_u$, and $X_v$ is $S_8$ or polysulfide.

18. The method of claim 10, wherein said applying comprises contacting the colloid and the anode after said adsorbing the polymer and prior to said drying.

* * * * *